(12) United States Patent
Nebendahl

(10) Patent No.: US 7,570,350 B2
(45) Date of Patent: Aug. 4, 2009

(54) DETECTING DIFFERENT SPECTRAL COMPONENTS OF AN OPTICAL SIGNAL BY MEANS OF AN OPTICAL SHUTTER

(75) Inventor: Bernd Nebendahl, Ditzingen (DE)

(73) Assignee: AP Sensing GmbH, Böeblingen (DE)

( * ) Notice: Subject to any disclaimer, the term of this patent is extended or adjusted under 35 U.S.C. 154(b) by 392 days.

(21) Appl. No.: 11/396,866

(22) Filed: Apr. 3, 2006

(65) Prior Publication Data
US 2006/0280399 A1  Dec. 14, 2006

(30) Foreign Application Priority Data
Jun. 9, 2005  (EP) .................. 05105036

(51) Int. Cl.
*G01N 21/00*  (2006.01)
(52) U.S. Cl. .................. 356/73.1; 385/15
(58) Field of Classification Search .................. 356/73.1; 385/15
See application file for complete search history.

(56) References Cited

U.S. PATENT DOCUMENTS

| | | | | |
|---|---|---|---|---|
| 4,356,396 A | | 10/1982 | Ruell et al. .................. 250/227 |
| 4,767,219 A | * | 8/1988 | Bibby .................. 374/123 |
| 5,217,306 A | * | 6/1993 | Wada .................. 374/161 |
| 5,390,018 A | * | 2/1995 | Fujita et al. .................. 356/73.1 |
| 5,446,280 A | * | 8/1995 | Wang et al. .................. 250/227.23 |
| 5,449,233 A | * | 9/1995 | Sai et al. .................. 374/161 |
| 5,765,948 A | | 6/1998 | Sai .................. 374/161 |

FOREIGN PATENT DOCUMENTS

| | | |
|---|---|---|
| EP | 0 588 612 | 3/1994 |
| EP | 0 502 283 | 4/1996 |
| EP | 1 273 955 A1 * | 7/2001 |
| EP | 1 126 264 | 8/2001 |

* cited by examiner

*Primary Examiner*—Tarifur Chowdhury
*Assistant Examiner*—Tara S Pajoohi

(57) ABSTRACT

Detecting different spectral components of a response signal received from a device under test -DUT- in response to a stimulus signal, with a first splitter receiving the response signal and wavelength depending splitting from response signal a first partial signal and a second partial signal, a second splitter receiving the second partial signal and wavelength depending splitting there from a third partial signal, an optical detector, for receiving the first partial signal and the third partial signal and determining a corresponding optical power, and an optical shutter arranged to be moved to either let through to or block from the optical detector one of: the first partial signal and the third partial signal.

9 Claims, 5 Drawing Sheets

DETECTING DIFFERENT SPECTRAL COMPONENTS OF AN OPTICAL SIGNAL BY MEANS OF AN OPTICAL SHUTTER

BACKGROUND ART

1. Field of the Invention

The present invention relates to a detection of spectral components of an optical signal.

2. Discussion of the Background Art

For a selection of parts or components of an optical signal, wavelength selective splitters/couplers are known that split the optical signal into a plurality of spectral components. Such filters might be built of so-called wavelength division multiplex (WDM) couplers, e.g. 4-port WDM couplers, or of multi-coated glass elements.

For measuring optical properties of an optical device under test (DUT), e.g. an optical fiber, it is known to apply a so-called optical time domain reflectometry (OTDR). For that purpose a short optical pulse is coupled into the DUT, which starts to travel along the DUT and which is partly scattered due to tiny inhomogeneities in the DUT, e.g. the inhomogeneities in the silica structure along the optical fiber. Some of the scattered light travels back to the DUT input. The power of this returning light is measured and put into relation with the elapsed time.

It is further known to separate different spectral components of the backscattered light from an optical fiber and to put these components into relation in order to obtain a distributed physical property of the fiber. Such an arrangement for measuring a temperature distribution along an optical fiber is e.g. described in U.S. Pat. No. 5,618,108.

SUMMARY OF THE INVENTION

It is an object of the invention to provide an improved detection of different components of an optical signal. The object is solved by the independent claims. Further embodiments are shown by the dependent claims.

According to an embodiment of the present invention, an optical arrangement comprising a first wavelength selective coupler, a second wavelength selective coupler, an optical shutter and an optical detector is provided. The arrangement receives a response signal from a device under test —DUT— in response to a stimulus signal emitted from a light source. The first wavelength selective coupler receives the response signal and splits the response signal into a first spectral part and a second spectral part. The second wavelength selective coupler receives the second spectral part and splitting from this part a third spectral part. Depending on the position or state of the optical shutter, the optical detector either receives both the first spectral part and the third spectral part or one of the first spectral part and the third spectral part. Therefore, the optical shutter is arranged to be movable between a first position and a second position to either let pass to or block from optical detector one of: the first spectral part and the third spectral part.

The arrangement further comprising a processing unit to control the optical shutter, to receive from the optical detector a first power information related to a first position of the optical shutter and a second power information related to a second position of the optical shutter, and to determine an optical property of the DUT as a function of the first power information and the second power information.

In a further embodiment, the third partial signal is conducted from the second wavelength selective coupler, over the optical shutter to the first wavelength selective coupler that combines both the first partial signal and the third partial signal and provides this combined signal to the optical detector, if the optical shutter is open and the first partial signal only, if the shutter is closed.

In a further embodiment, the first wavelength selective coupler and the second wavelength selective coupler are free space optical elements and all optical signals are free space optical beams. The first wavelength selective coupler receives the response signal from the DUT at a first surface, let through the first partial signal to the detector and reflects the second partial signal to the second wavelength selective coupler. The second wavelength selective coupler lets through the third partial signal and reflects the rest signal. The third partial signal is conducted back to a second surface of the first wavelength selective coupler opposite to the first surface. This surface is arranged to reflect this third partial signal collinearly with the first partial signal to the detector.

The third partial signal is preferably conducted back from the first wavelength selective coupler to the third wavelength selective coupler such that the path of this signal and the path of the second partial signal form a parallelogram.

In a further embodiment, the optical shutter is realized as rotatable light-impermeable cylinder comprising a through hole.

In a further embodiment, the stimulus signal is conducted over the second wavelength selective coupler and the first wavelength selective coupler to the DUT in opposite direction to the second partial signal and the response signal.

In a further embodiment, the DUT is an optical fiber of a defined length, the response signal comprises light backscattered over a time period corresponding to the travel time of the first signal through the DUT, and the first power information and the second power information are functions over time. The processing unit determines a distributed physical property over the length of the DUT on the base of the first power information the second power information and the velocity of light within the DUT.

In a further embodiment, the processing unit controls the light source such that the stimulus signal comprises a sequence of optical pulses. The processing unit further determines a first correlation function by correlating said sequence with the first power information, and a second correlation function by correlating said sequence with the second optical power information, and to determine the distributed physical property on the base of the first correlation function and the second correlation function.

In a further embodiment, the first partial signal an Anti stokes signal with a center wavelength at a first response wavelength, and the third partial signal is a Stokes signal with a center wavelength at a second response wavelength or vice versa. The distributed physical property is a temperature profile along at least a part of the DUT.

The invention can be partly or entirely embodied or supported by one or more suitable software programs, which can be stored on or otherwise provided by any kind of data carrier, and which might be executed in or by a data processing unit of an optical time domain reflectometer executing the method described above.

BRIEF DESCRIPTION OF THE DRAWINGS

Other objects and many of the attendant advantages of embodiments of the present invention will be readily appreciated and become better understood by reference to the following more detailed description of preferred embodiments in connection with the accompanied drawings. Features that are substantially or functionally equal or similar will be referred to with the same reference signs.

DETAILED DESCRIPTION OF THE PREFERRED EMBODIMENT

Figure 1:
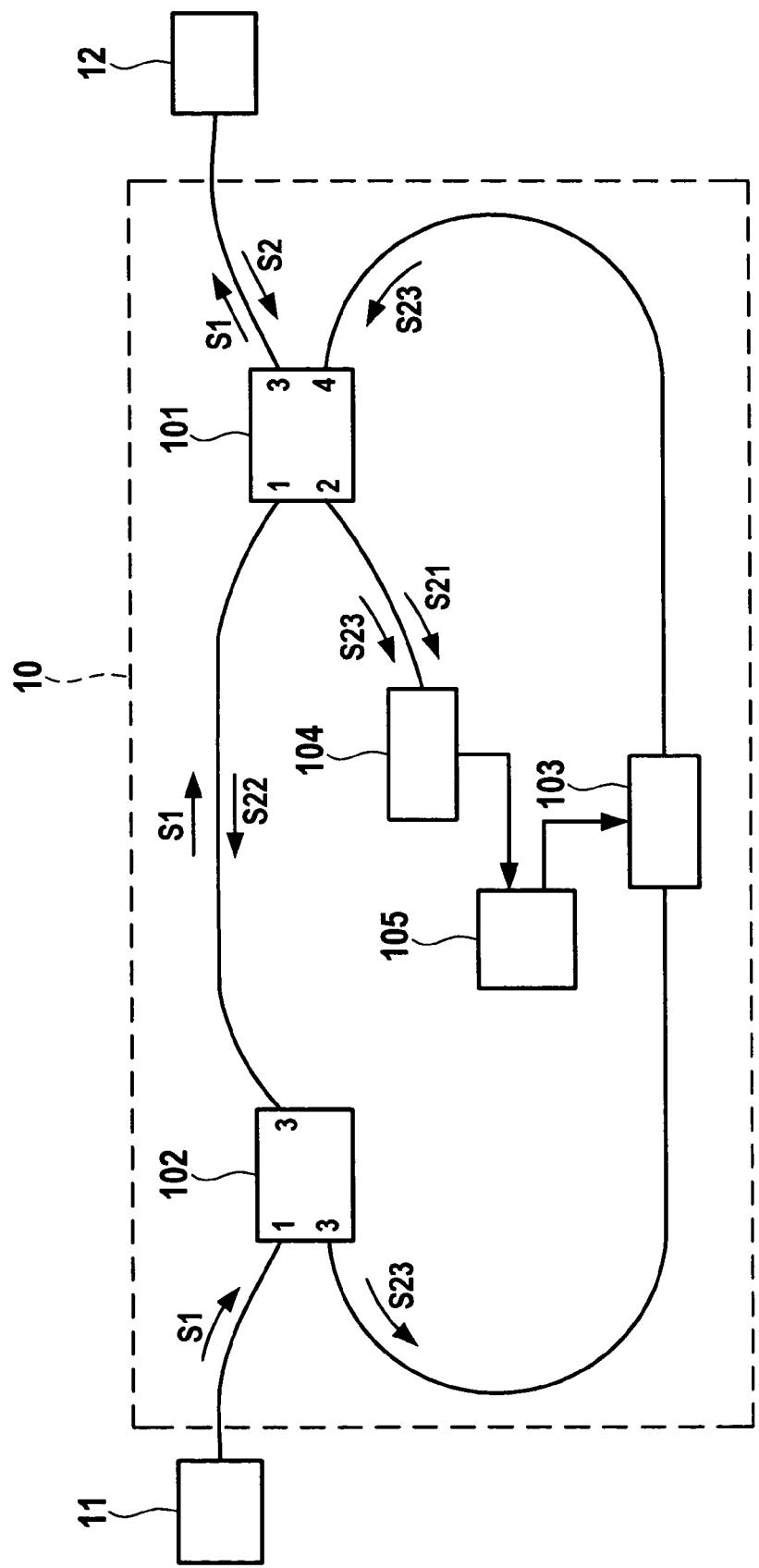
FIG. 1 shows block diagram of an exemplary measurement setup according to the present invention.

Referring now in greater detail to the drawings, FIG. 1 shows an embodiment of a fiber optic measurement setup comprising a light source 11, a arrangement 10 and a device under test—DUT—12. The arrangement 10 comprises a first wavelength selective coupler 101, further referred to as first coupler 101, and a second wavelength selective coupler 102, further referred to as second coupler 102, an optical shutter 103, an optical detector 104 and a processing unit 105. The DUT 12 is connected over a first optical fiber (constituting a first optical path) to a third port of the first coupler 101. A second optical fiber is connected between a first port of the coupler 101 and a third port of the second coupler 102 (constituting a second optical path). A third optical fiber is connected between a second port of the second coupler 102 over the optical shutter 103 to a fourth port of the first coupler 101 (constituting a third optical path). A fourth optical fiber is connected between a second port of the first coupler 101 to the optical detector 104 (constituting a fourth optical path). A fifth optical fiber is connected between the light source 11 and a first port of the second coupler 102 (constituting a fifth optical path).

The couplers 101 and 102 are by way of example realized as so-called wavelength division multiplexer (WDM) coupler/filters, whereof the first coupler is a 4-port coupler that might select a high spectral part of the signal S2, received at its third port, to its second port and the rest of the signal S2 at is first port. Vice versa, a high spectral part of a signal received at its fourth port provided to the first port and the rest of the signal is provided to the second port. The second coupler 102 is a 3-port coupler that might select a low spectral part of the signal S22, received at its third port, to its second port and the rest of the signal S2 at is first port. Alternatively couplers 101 and 102 can be built of optical circulators and appropriate fiber bragg gratings.

The light source 11 launches a stimulus signal S1 to be received by the DUT 12. In the examples described here, the stimulus signal S1 is conducted over the fifth optical path, the second coupler 102, the second optical path, the first coupler 101 and the first optical path. The DUT emits back a response signal S2 in the opposite direction of the first optical path received at the first coupler 101. The first coupler 101 splits this signal S2 into two spectral parts and provides a first partial signal S21 at the second port and a second partial signal S22 at its first port accordingly. The first partial signal S21 is conduced over the fourth optical path to the detector 104. The second partial signal S22 is conducted over the second optical path to the second coupler 102 (in opposite direction to the stimulus signal S1). The second coupler selects a further spectral part of this signal S22 and provides a third partial signal S23 at its second port accordingly. This signal is conducted over the third optical path to the fourth port of the first coupler 101. As both the first and the second coupler are complementary to the respect that the first coupler 101 filters out the high spectral part of the response signal S2 to be provided as second partial signal S22 and the second coupler 102 filters out the low spectral part of the second partial signal S22 to be provided as third partial signal S23, the first coupler directs the entire spectrum of this signal to the detector 104 unless the shutter 103 is closed.

Figure 2:
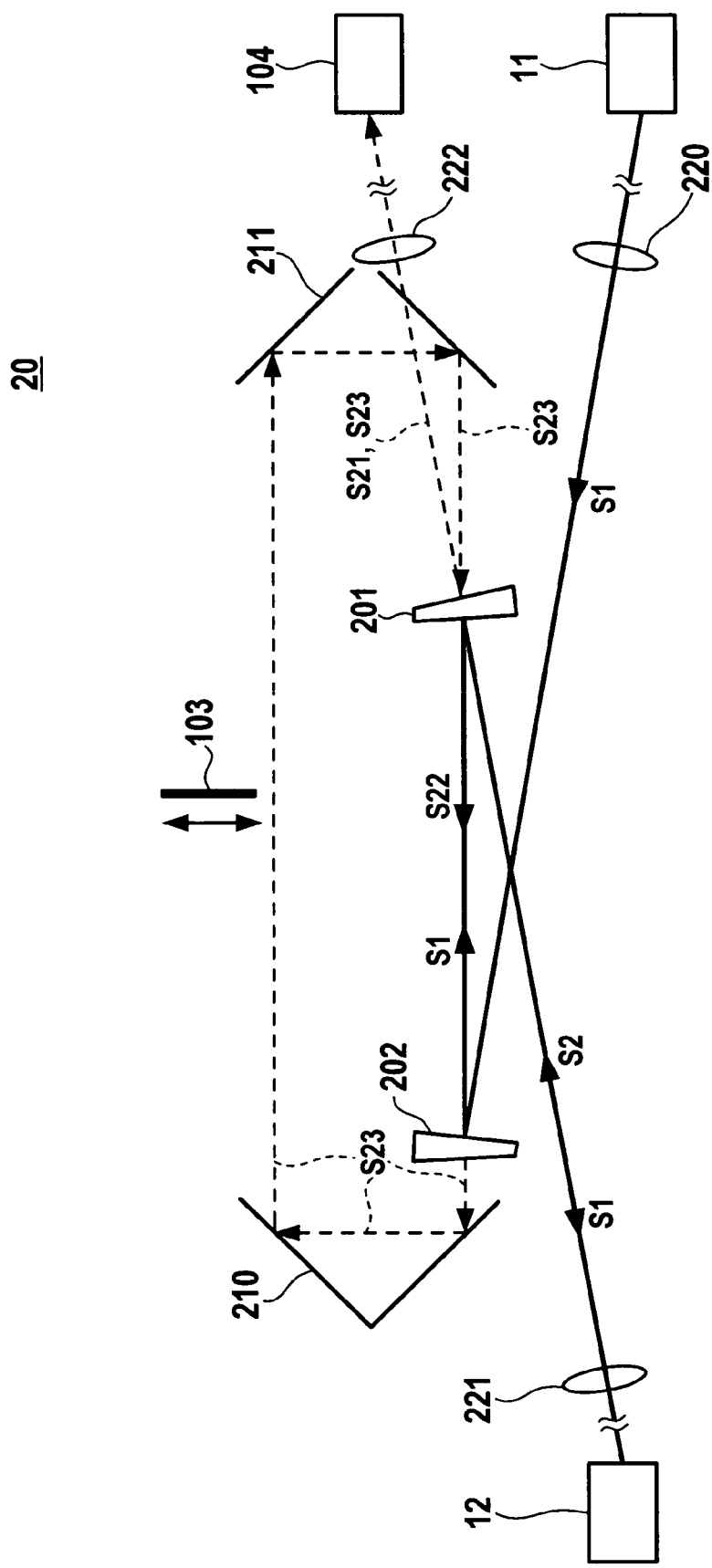
FIG. 2 shows an alternative exemplary schematic block diagram of an exemplary measurement setup according to the present invention.

The optical shutter 103 is adapted to be moved between two positions, symbolized by a double arrow in FIG. 2: In a first or passing position, the shutter does not affect the optical signal, i.e. the third partial signal representing the spectral part is let through unaffected. In a second or blocking position, the shutter blocks the optical signal, i.e. the third spectral part is prevented to be incident on the detector 104. The shutter might me realized as light blocking device that can be moved or swiveled into an optical beam. Differently to an optical switch, that directs an optical signal either to a first port or to a second port, such shutter can be realized to be nearly ideal, i.e. with zero attenuation in the first position, and nearly total attenuation (e.g. >50 dB) in the second position. Further, the shutter shows a nearly ideal repeatability. Alternatively to a mechanically actuated device, the optical shutter can be realized as electro absorption modulator (EAM).

The detector 104 convert the incident light into electrical signals and transmits these electrical signals to the control unit 105. The electrical signals show a voltage or current proportional to the power of the incident light; therewith the control unit 105 receives a first electrical signal E1 proportional to the combined power of the first spectral part S21 and the third spectral part S23, if the shutter 103 is open, and a second electrical signal E2 proportional the power of the first spectral part S21 if the shutter 103 is closed.

The processing unit 105 receives both the first electrical signal E1 and the second electrical signal E2 and calculates a relation of the optical powers of the first spectral part S21 and the third spectral part S23. An optical property of the DUT 12 is derived as a function of this relation.

FIG. 2 shows an embodiment of a bulk or free space optical measurement setup wherein the arrangement of FIG. 1 is replaced by a free space arrangement 20. The first and second fiber optical couplers 101 and 102 of FIG. 1 are replaced by free space optical filter elements 201 and 202. Further a first retro reflector 210 and a second retro reflector 211 are also described in Fig. 2. The optical signals S1, S2, S21, S22, S23 are free space optical beams.

The first wavelength selective coupler or optical filter 201 receives the response signal S2 from the first optical path at a first surface, lets through the first partial signal S21 from the first optical path to the fourth optical path and reflects the second partial signal S22 from the first optical path to the second optical path, receives the third partial signal S23 from the third optical path at a second surface opposite to the first surface and reflects this third partial signal S23 to the fourth optical path.

The second wavelength selective coupler or optical filter 202 receives the second partial signal S22 from the second optical path, and lets through the third partial signal S23 from the second optical path to the third optical path.

The third optical path is directed over the first and second retro reflector 210, 211 so that second optical path and the third optical path form a parallelogram. The plane described by this paths is preferably pivoted in relation to the plane described by the first, second and fourth optical path, so that there is enough space for placing the retro reflectors especially in a densely spaced arrangement.

The optical shutter 103 might be realized as rotatable light-impermeable cylinder comprising a through hole that lets through the corresponding optical beam in a position, wherein the through hole is collinear with the optical beam.

In a further alternative, the stimulus signal S1 is transmitted over the second wavelength selective coupler 202 and the first wavelength selective coupler 201 to the DUT 12 in opposite direction to the second partial signal S22 and the response signal S2.

A plurality of collimating lenses is preferably provided to focus the optical beams to and from the arrangement 20. By way of example, three collimating lenses 220, 221 and 222 are provided each in front of the light source 11, the DUT 12 and the detector 104.

The wavelength selective couplers are preferably glass elements with parallel optical surfaces or slightly inclined surfaces (to avoid multi reflections). The glass elements are provided with a multi-layer dielectric thin film coating preferably oriented towards the stimulus beam S1 and the second partial beam S22 (i.e. the surfaces facing to each other). The other surfaces are preferably anti reflection coated.

Figure 3:
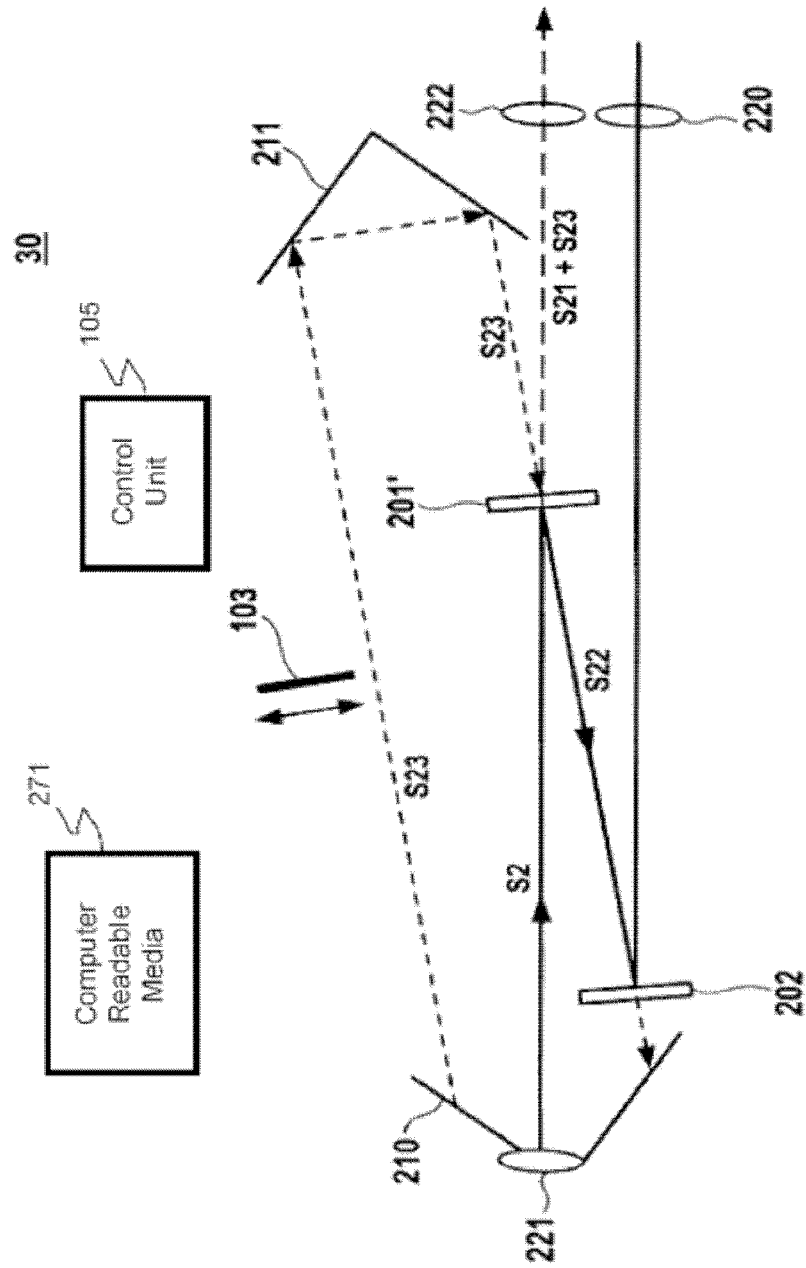
FIG. 3 shows a further alternative exemplary schematic block diagram of an exemplary measurement setup according to the present invention.

FIG. 3 shows a variant of the embodiment of FIG. 2. This variant comprises the same optical elements that are in principle arranged in the same order. However, the difference between this variant and the variant of FIG. 2 is that the first wavelength selective coupler 201' is pivoted with respect to the wavelength selective coupler 201 of FIG. 2. Accordingly, the DUT 12 and the optical detector 104 (both not shown here) are differently placed. Thereby, the first wavelength selective coupler is pivoted such that the first optical path and the fifth optical path are parallel.

FIG. 3 also describes a software program or product, preferably stored on a data carrier of a control unit, for controlling the detection of different spectral components of a response signal from the DUT.

The stimulus signal S1 might be a continuous optical signal or a signal comprising a single light pulse. Alternatively to a single pulse light, the stimulus signal comprises a plurality of light pulses, wherein the light pulses are positioned according to a specific predetermined digital sequence. In this case, the response signal S2 is composed of an overlay of a plurality of corresponding shifted impulse responses from the DUT. To determine the impulse response, the control unit 105 might perform a correlation of each of these signals with the predetermined sequence of the corresponding probing signal. As result of these correlations, optical power functions versus time are produced.

As sequences for the probing signal digital pseudo random codes can be used. The autocorrelation function of a digital pseudo random code shows a maximum at zero shift and residual side lobes. Thus, neglecting the side lobes, the correlation of a probing signal S1 with a response signal from DUT 105 represents the impulse answer of DUT 105. Alternatively, complementary codes like so-called Golay codes can be used. Such codes have the advantage that the side lobes are cancelled out. Further information of applying impulse sequences in OTDR applications is described in the international application PCT/EP2004/052670 of the same applicant.

In an embodiment, the DUT 12 is an optical fiber. The response signal S2 is backscattered from the DUT 12 in response to a stimulus signal S1 at a transmission wavelength $\lambda_T$. A fraction of the backscattered light having a different wavelength compared to the incident light, the so-called Raman Anti Stokes light, is subject to the temperature of the DUT. This allows for determining a temperature profile along the DUT by analyzing the response signal S2. Such techniques are e.g. described in the above-mentioned international application PCT/EP2004/052670.

Alternatively instead of using the optical time domain reflectometry detection scheme (OTDR) the optical frequency domain reflectometry scheme (OFDR) can be used, which finally yields the same information about the DUT.

Figure 4:
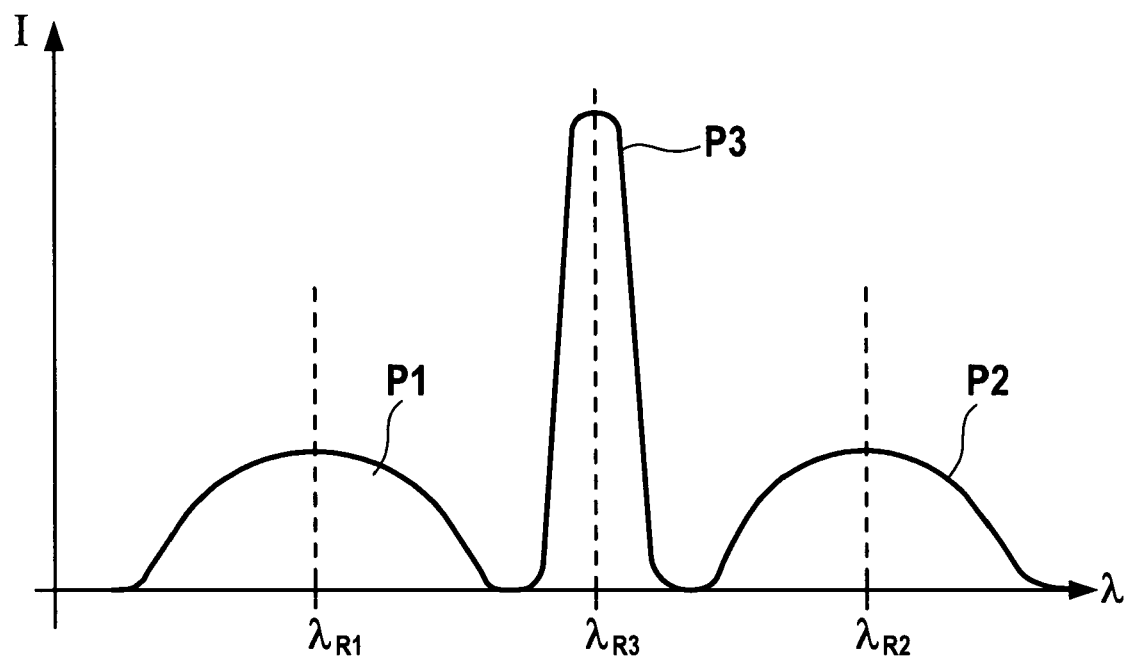
FIG. 4 shows a diagram with exemplary spectral distributions of a probing signal and response signals.

FIG. 4 shows an exemplary sketch diagram of an optical power P of the response signal S2 over the wavelength $\lambda$. Three peaks P1, P2 and P3, representing three corresponding spectral components, are shown at center wavelengths $\lambda_{R1}$, $\lambda_{R2}$ and $\lambda_{R3}$ respectively. The response signal S2 backscattered from the optical fiber comprises light backscattered over a time period corresponding to the travel time of the stimulus signal through the DUT.

By way of example, third peak P3 represents a so-called Rayleigh backscattering component, first peak P1 represents a so-called 25 Raman Anti Stokes backscattering component and second peak P2 represents a so-called Raman Stokes backscattering component. Whereas the Rayleigh backscattering spectral signal part is returning at the same wavelength $\lambda_{R3}$ as the probe or stimulus signal, the other backscattered spectral signals parts are returning at wavelengths $\lambda_{R1}$, $\lambda_{R2}$ different to the wavelength $\lambda_{R3}$ of the probe signal. Third peak P3 around first wavelength $\lambda_{R3}$ is relatively high and sharp, whereas first and second peak P1 and P2 around first and second center wavelength $\lambda_{R1}$ and $\lambda_{R2}$ respectively are relatively low and wide compared to third peak P3.

In a possible realization, transmission wavelength $\lambda_{R3}$ is about 1000 nm. The width of third peak P3 is about 10 nm. The suitable ranges of first and second peak P1 and P2 are in the range of 900-980 nm and 1020-1 100 nm respectively.

The wavelength selective couplers described above have a wavelength selecting property such that the first partial signal S21 corresponds to the first peak P1 and the third partial signal S23 corresponds to the second peak P3.

With the following FIG. 5*a*-FIG. 5*c*, a determination of a temperature profile along an optical fiber will be explained.

Figure 5A:
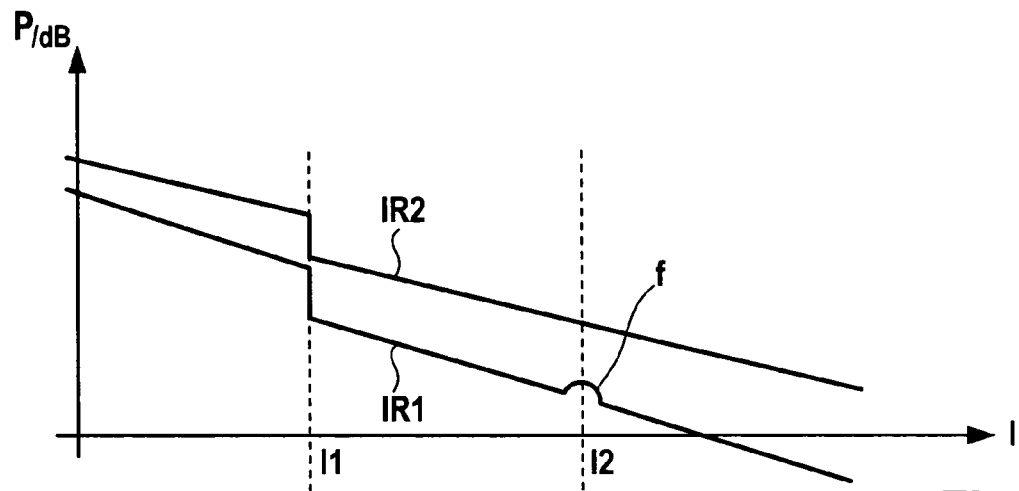
FIG. 5a shows a diagram with exemplary response signals over the time or location.

FIG. 5*a* shows a diagram of an exemplary first partial signal S21 or first impulse response signal IR1 and third partial signal S23 or second impulse response signal IR2 over the time or location. First impulse response signal IR1 and second impulse response signal IR2 represent the signal power depicted logarithmically (in dB) over the length l of the fiber. First impulse response signal IR1, further also referred to as Antistokes signal, represents the power of the Antistokes backscattered signal and second impulse response signal IR2, further also referred to as Stokes signal, represents the power of the Stokes backscattered signal. By way of example, the attenuation of the Antistokes signal is greater that the attenuation of the Stokes signal. The attenuation of each of the both signals in the optical fiber depends on each the wavelength of the signals and is mainly specific to the material of the optical fiber (e.g. glass). The optical fiber is of homogeneous material and geometry. In the example shown, a splice is located at length l1.

By way of example, the ambient temperature of the optical fiber is assumed to be constant, except at a second location 12, where a local temperature increase is assumed. As mainly the Anti-Stokes signal IR1 is affected by the ambient fiber temperature, the Stokes signal IR2 remains almost linear at this location whereas the Antistokes signal shows a peak f at this location.

By timing the arrival of the return signal, the optical power, or generally the physical property, can be depicted on a distance scale using the speed of light in the DUT 12 as conversion factor.

Figure 5B:
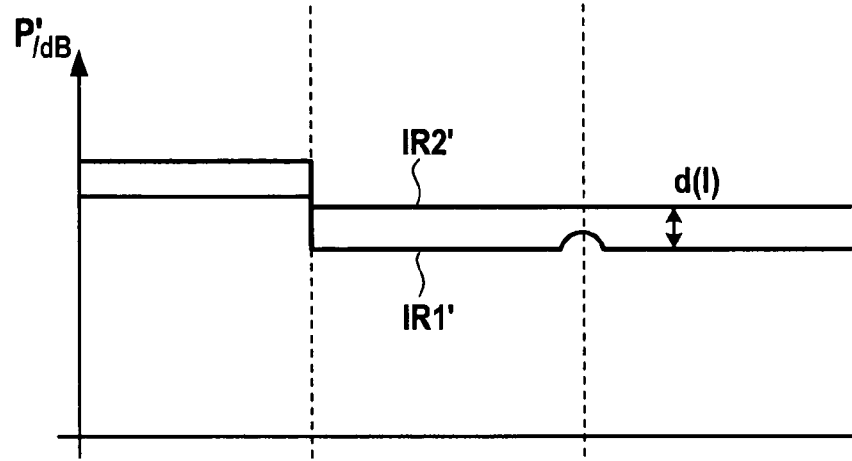
FIG. 5b shows a diagram with normalized response signals of FIG. 5a, and FIG. 5c shows a diagram with a temperature distribution derived from FIG. 5b.

FIG. 5b shows a diagram, wherein the impulse response signals of FIG. 5a are normalized according to the fiber attenuation at each response wavelength $\lambda_{R1}$ and $\lambda_{R2}$ respectively, i.e. the first normalized impulse response signal IR1' corresponds to first impulse response signal IR1 multiplied with a first linear function over the length I, wherein the slope corresponds to the attenuation at the first response wavelength $\lambda_{R1}$, and the second normalized impulse response signal IR2' corresponds to second impulse response signal IR2 multiplied with a second linear function over the length I, wherein the slope corresponds to the attenuation at the second response wavelength $\lambda_{R2}$.

The ratio of the signal power of the normalized impulse response signals can be written as follows:

$$P_{stokes}/P_{antistokes} = e^{-h \cdot \Delta v / k \cdot T}, \text{ with}$$

h being the Planck constant, $\Delta v = c(1/\lambda_T - 1/(\lambda_T - \Delta\lambda))$ with c being the light speed, k being the Boltzmann constant, and T being the temperature.

After taking the natural logarithm of both sides, the following result is obtained:

$$\log(P_{stokes}/P_{antistokes}) = \log(P_{stokes}) - \log(P_{antistokes}) = -h \cdot \Delta v / k \cdot T$$

Thus, the log difference d(I) between first normalized impulse response signal IR1' and second normalized impulse response signal IR2' is proportional to the inverse of the temperature at the location I (~1/T(I)). The attenuation of the fiber can be derived from a data sheet depicting the fiber attenuation over wavelength or can be directly measured or taken from the diagram in FIG. 5a.

Figure 5C:
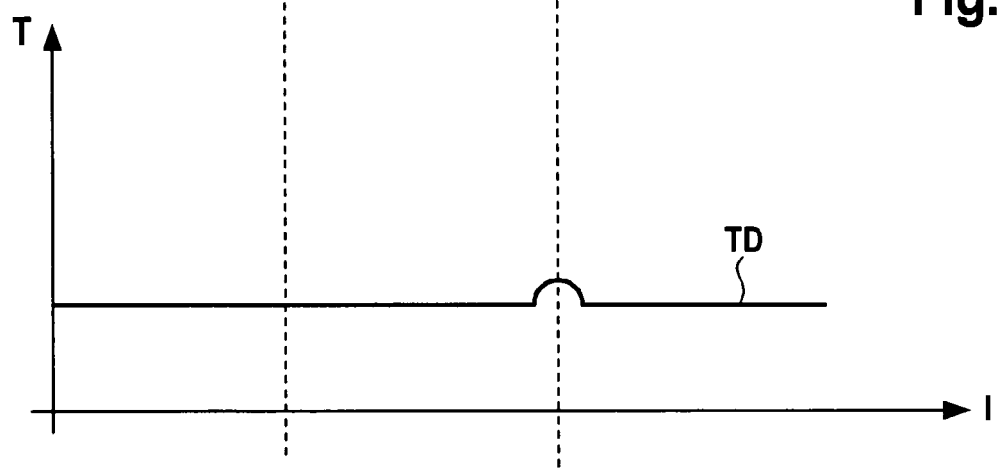

FIG. 5c shows a diagram with a temperature distribution curve TD derived from FIG. 5b as a function of the temperature T over the fiber length I. As in FIG. 5b the difference d(I) between the normalized impulse response signals is proportional to the inverse of the temperature, curve TD shown here is a function of the inverse of the difference d(I).

Therewith, an optical fiber can be used as temperature sensing element. Using an optical fiber as sensing element is especially interesting under harsh environmental conditions because the optical fiber can be made very temperature robust. Further, there is no inherent spatial limitation for the temperature distribution imposed by the sensing fiber.

Alternatively, the physical property can be strain, pressure or humidity in the ambience of DUT 105.

What is claimed is:

1. An optical arrangement for receiving a response signal returned from a device under test—DUT—in response to a stimulus signal received from a light source, comprising:
   a first splitter for receiving the response signal and for wavelength dependent splitting the response signal into a first partial signal and a second partial signal,
   a second splitter for receiving the second partial signal and for wavelength dependent splitting therefrom a third partial signal with a third spectral component,
   an optical detector for receiving the first partial signal and the third partial signal and detecting an optical power of the received signals,
   an optical shutter arranged to be moved to either let through to or block from the optical detector one of: the first partial signal and the third partial signal, and
   a first optical path for conducting the response signal from the DUT to the first splitter, a second optical path for conducting the second partial signal path from the first splitter to the second splitter, a third optical path for conducting the third partial signal from the second splitter, over the optical shutter to the first splitter, and a fourth optical path for conducting the first partial signal and the third partial signal to the optical detector.

2. The arrangement of claim 1, wherein the first splitter and the second splitter are free space optical elements, and wherein the optical signals are free space optical beams.

3. The arrangement of claim 2, wherein
   the first splitter is arranged to receive the response signal from the first optical path at a first surface, to let through the first partial signal from the first optical path to the fourth optical path and to reflect the second partial signal from the first optical path to the second optical path, and to receive the third partial signal from the third optical path at a second surface opposite to the first surface and to reflect this third partial signal to the fourth optical path,
   the second splitter is arranged to receive the second partial signal from the second optical path, and to let through the third partial signal from the second optical path to the third optical path.

4. The arrangement of claim 3, wherein the third optical path is directed over a first and a second retro reflector, so that second optical path and the third optical path form a parallelogram.

5. The arrangement of claim 3, wherein the optical shutter is realized as rotatable light-impermeable cylinder comprising a through hole.

6. The arrangement of claim 1, for receiving the stimulus signal at the second splitter and to conduct this signal over the first splitter to the DUT in opposite direction to the second partial signal and the response signal.

7. The arrangement of claim 1, wherein the first partial signal is one of: an Anti stokes signal with a center wavelength at a first response wavelength and a Stokes signal with a center wavelength at a second response wavelength, and the third partial signal is the other of the Stokes signal or Anti stokes signal and wherein the distributed physical property is a temperature profile along at least a part of the DUT.

8. An optical arrangement for receiving a response signal returned from a device under test—DUT—in response to a stimulus signal received from a light source, comprising:
   a first splitter for receiving the response signal and for wavelength dependent splitting the response signal into a first partial signal and a second partial signal,
   a second splitter for receiving the second partial signal and for wavelength dependent splitting therefrom a third partial signal with a third spectral component,
   an optical detector for receiving the first partial signal and the third partial signal and detecting an optical power of the received signals,
   an optical shutter arranged to be moved to either let through to or block from the optical detector one of: the first partial signal and the third partial signal, and
   a processing unit for controlling the optical shutter, to receive from the optical detector a first power information related to a first position of the optical shutter and a second power information related to a second position of the optical shutter,
   and to determine an optical property of the DUT as a function of the first power information and the second power information,
   wherein the DUT is an optical fiber of a defined length, wherein the response signal comprises light backscattered over a time period corresponding to the travel time of the stimulus signal through the DUT, and wherein the first power information and the second power information are functions over time, and wherein the processing unit determines a physical property over the length of the DUT on the base of the first power information the second power information and the velocity of light within the DUT.

9. An optical arrangement for receiving a response signal returned from a device under test—DUT—in response to a stimulus signal received from a light source, comprising:

a first splitter for receiving the response signal and for wavelength dependent splitting the response signal into a first partial signal and a second partial signal, a second splitter for receiving the second partial signal and for wavelength dependent splitting therefrom a third partial signal with a third spectral component, an optical detector for receiving the first partial signal and the third partial signal and detecting an optical power of the received signals, an optical shutter arranged to be moved to either let through to or block from the optical detector one of: the first partial signal and the third partial signal, and a processing unit for controlling the optical shutter, to receive from the optical detector a first power information related to a first position of the optical shutter and a second power information related to a second position of the optical shutter, and to determine an optical property of the DUT as a function of the first power information and the second power information, wherein the processing unit controls the light source such that the stimulus signal comprises a sequence of optical pulses, to determine a first correlation function by correlating said sequence with the first power information, and a second correlation function by correlating said sequence with the second optical power information, and to determine the distributed physical property on the base of the first correlation function and the second correlation function.

* * * * *